United States Patent
Morris

(10) Patent No.: US 9,527,018 B2
(45) Date of Patent: Dec. 27, 2016

(54) DEBRIS DRAIN FILTER SYSTEM AND CARTRIDGE

(71) Applicant: CATERPILLAR INC., Peoria, IL (US)

(72) Inventor: Bryant Alan Morris, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 343 days.

(21) Appl. No.: 14/242,666

(22) Filed: Apr. 1, 2014

(65) Prior Publication Data

US 2015/0273370 A1    Oct. 1, 2015

(51) Int. Cl.
*B01D 35/00* (2006.01)
*B01D 36/00* (2006.01)
*B01D 45/14* (2006.01)

(52) U.S. Cl.
CPC .......... *B01D 35/005* (2013.01); *B01D 36/006* (2013.01); *B01D 45/14* (2013.01)

(58) Field of Classification Search
None
See application file for complete search history.

(56) References Cited

U.S. PATENT DOCUMENTS

| | | | | |
|---|---|---|---|---|
| 2,983,384 A * | 5/1961 | Winslow | ............... | B01D 29/21 210/132 |
| 3,370,707 A | 2/1968 | Nordstrom | | |
| 3,428,180 A | 2/1969 | Rogers | | |
| 3,796,025 A * | 3/1974 | Kasten | ............... | B01D 53/26 55/302 |
| 4,053,405 A | 10/1977 | Dekeyser et al. | | |
| 4,384,962 A * | 5/1983 | Harris | ............... | B01D 17/0208 210/259 |
| 4,420,392 A * | 12/1983 | Harris | ............... | B01D 17/0208 210/114 |
| 4,692,175 A * | 9/1987 | Frantz | ............... | B01D 29/23 55/319 |
| 8,241,493 B2 * | 8/2012 | Beard | ............... | B01D 29/21 210/232 |
| 8,815,090 B2 * | 8/2014 | Beard | ............... | B01D 29/21 210/299 |
| 2009/0308801 A1 * | 12/2009 | Beard | ............... | B01D 29/15 210/234 |
| 2011/0073537 A1 | 3/2011 | Allott et al. | | |
| 2013/0313183 A1 | 11/2013 | Allott et al. | | |

FOREIGN PATENT DOCUMENTS

WO    2011110952    9/2011

* cited by examiner

*Primary Examiner* — Benjamin Kurtz

(57) ABSTRACT

A filter cartridge and filter system are disclosed. The filter cartridge includes a filter element, a filter housing, and precleaner element. The filter housing includes a sidewall surrounding the filter element and having a closed axial end located at one end of the sidewall, the closed axial end having an opening. The precleaner element is located near the axial end of the filter housing. The precleaner element includes an annular member disposed, an inner plate disposed within the annular member and having a vertical opening in fluid communication with the opening in the closed axial end of the filter housing, an upper plate disposed below the annular member, a support portion extending upward from the upper plate, a radial opening defined by the annular member, the upper plate, and the support portion, a fluid flow passage connecting the radial opening to the vertical opening.

17 Claims, 5 Drawing Sheets

DEBRIS DRAIN FILTER SYSTEM AND CARTRIDGE

TECHNICAL FIELD

The present disclosure generally pertains to filter systems, and is more particularly directed to canister filter systems for removing debris from liquids, such as lube oil or liquid fuels.

BACKGROUND

Canister filters are frequently used on a variety of equipment including gasoline engines, construction equipment, and many other types of industrial equipment. These filters are used to remove debris from liquids in fluid systems such as hydraulic systems, lubrication systems, and fuel systems.

Canister filter systems usually include a base that is attached to the equipment, a canister (also called a housing, cup, can, or cover), and a filter element, which is removably positioned inside the canister. Once the filter has been placed inside the canister, the canister is attached to the base to form a sealed enclosure around the filter element. The canister, base, and filter element define fluid pathways directing fluid flow through the filter element. The filter element contains filter media that removes, and collects contaminants from the fluid passing through. Collected contaminants can include dirt, water, soot, ash, metal shavings and other harmful debris.

U.S. Patent Application. 2013/0313183 to M. Allott et al. is directed to a filter element having a center tube defining a central reservoir and including an interior sidewall, an end plate and a pocket defining a port extending from the end plate into the central reservoir. The pocket of the filter element includes an inner wall, an outer wall, and a plurality of projections extending from the outer wall of the pocket toward the interior sidewall of the center tube.

The present disclosure is directed toward overcoming one or more of the problems discovered by the inventors or that is known in the art.

SUMMARY OF THE DISCLOSURE

In one embodiment, a filter cartridge is disclosed. The filter cartridge includes a filter element, a filter housing, a tubule member, an upper plate, and a support portion. The filter housing includes a sidewall surrounding the filter element and having a closed axial end located at one end of the sidewall, the closed axial end having an opening. The tubule member is located proximate to the closed axial end of the filter housing. The tubule member includes an annular member and an inner plate disposed within the annular member and having a vertical opening in fluid communication with the opening of the closed axial end of the filter housing. The upper plate is located beneath the tubule member and the support portion extends upward from the upper plate toward the tubule member. A radial opening is defined by the annular member, the upper plate, and the support portion and a fluid flow passage disposed between the tubule member and the upper plate connects the radial opening to the vertical opening.

In another embodiment, a filter system is disclosed. The filter system includes a cartridge and a drain. The filter cartridge includes a filter element, a filter housing, and a precleaner element. The filter housing includes a sidewall surrounding the filter element and having a closed axial end located at one end of the sidewall. The closed axial end of the filter housing has an opening. The precleaner element is located proximate to the closed axial end of the filter housing. The precleaner element includes an annular member, an inner plate disposed within the annular member and having a vertical opening in fluid communication with the opening in the closed axial end of the filter housing, an upper plate disposed below the annular member, a support portion extending upward from the upper plate, a radial opening defined by the annular member, the upper plate, and the support portion, and a fluid flow passage connecting the radial opening to the vertical opening. The drain has an inlet end in fluid communication with the precleaner element.

In yet another embodiment, another filter cartridge is disclosed. The filter cartridge includes a filter element and a precleaner element. The filter element includes a filter media and an end plate disposed at one end of the filter media. The precleaner element is located below and connected to the end plate of the filter element. The precleaner element includes an annular member, an inner plate disposed within the annular member and having a vertical opening in fluid communication with the filter media, an upper plate disposed below the annular member, a support portion extending upward from the upper plate, a radial opening defined by the annular member, the upper plate, and the support portion, and a fluid flow passage connecting the radial opening to the vertical opening.

DETAILED DESCRIPTION

The systems and methods disclosed herein include a filter cartridge including a filter element, a filter housing holding the filter element, and a precleaner element located at a lower end of the filter housing. In embodiments, the filter cartridge and its components are located within a canister of a filter system. The filter housing blocks provides a barrier to prevent fluid from flowing into the filter element radially. The precleaner element, located at the lower end of the filter housing, has radial openings that allow fluid to flow radially into flow paths formed within the precleaner element. The flow paths within the precleaner element connect to openings in an upper end of the precleaner element. The openings in the upper end of the precleaner element are adjacent to axial openings in the filter housing, and fluid can flow out of the precleaner element and into the filter housing through the openings at the upper end of precleaner element.

Figure 1:
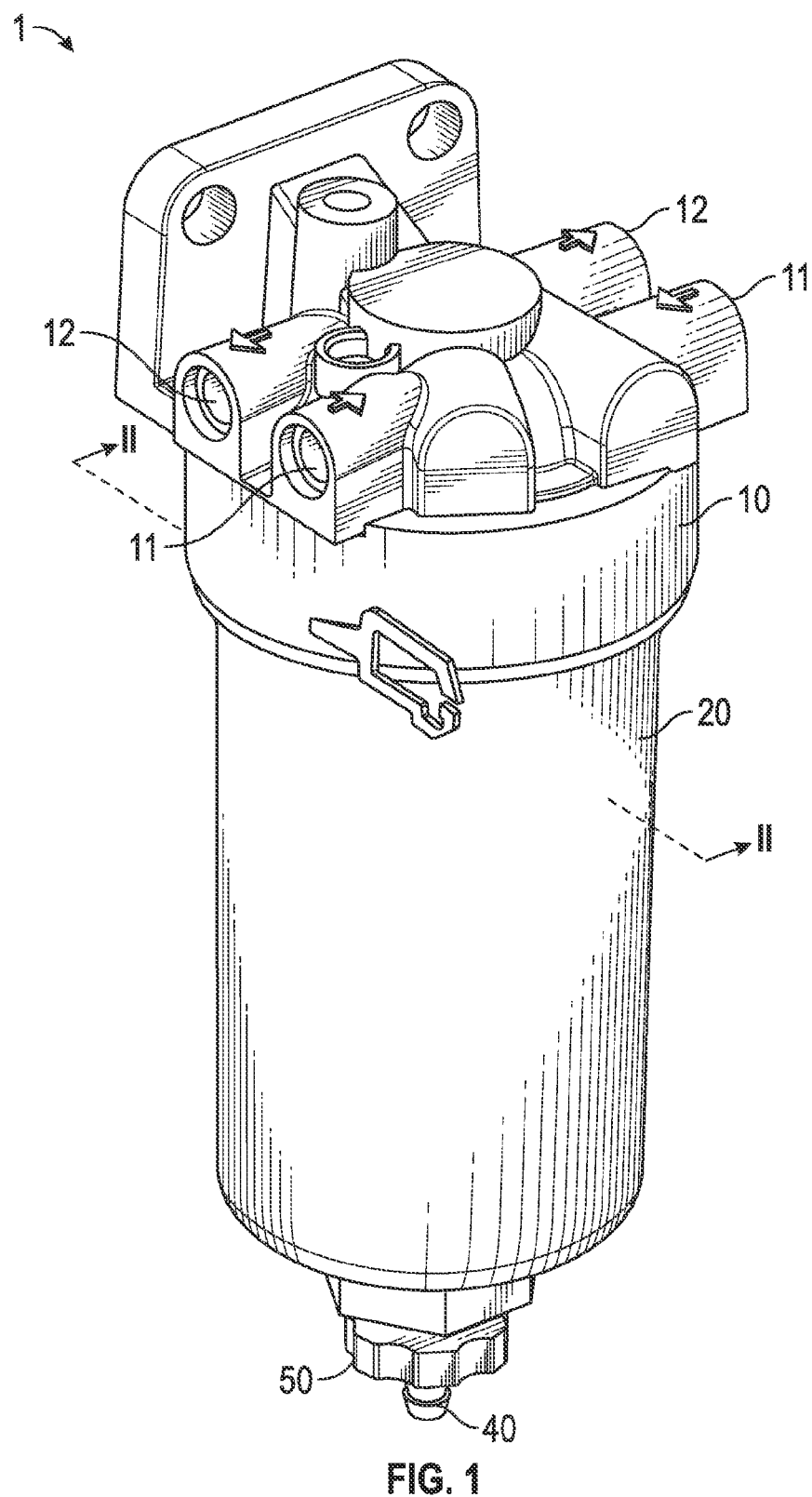
FIG. 1 is a prospective view of a canister filter system.

FIG. 1 is a perspective view of a canister filter system 1. As illustrated, the canister filter system 1 has a base 10, and a canister 20. The canister filter system 1 also includes a filter cartridge 30 (not illustrated in FIG. 1, and discussed in greater detailed below). The general construction and use of a canister filter system is understood by those of ordinary skill in this art. Thus, all the details of the construction and use of canister filter system 1 need not be explained here.

The canister filter system 1 may be used to filter fluids such as diesel or gasoline or other liquid fuels, lubrication oil, hydraulic fluid for hydraulic power systems, transmission fluid, or even possibly intake air for an engine. The canister filter system 1 may also be used as a fuel/water separator filter. The canister filter system 1 with the features described herein could be adapted by those of ordinary skill in this art to serve many different purposes and suit many other applications.

As illustrated, the base 10 includes one or more inlet ports 11 through which fluid can be pumped or sucked into the canister filter system 1. The base 10 also includes one or more outlet ports 12 through which fluid can be pumped or sucked out of the canister filter system 1

Figure 2:
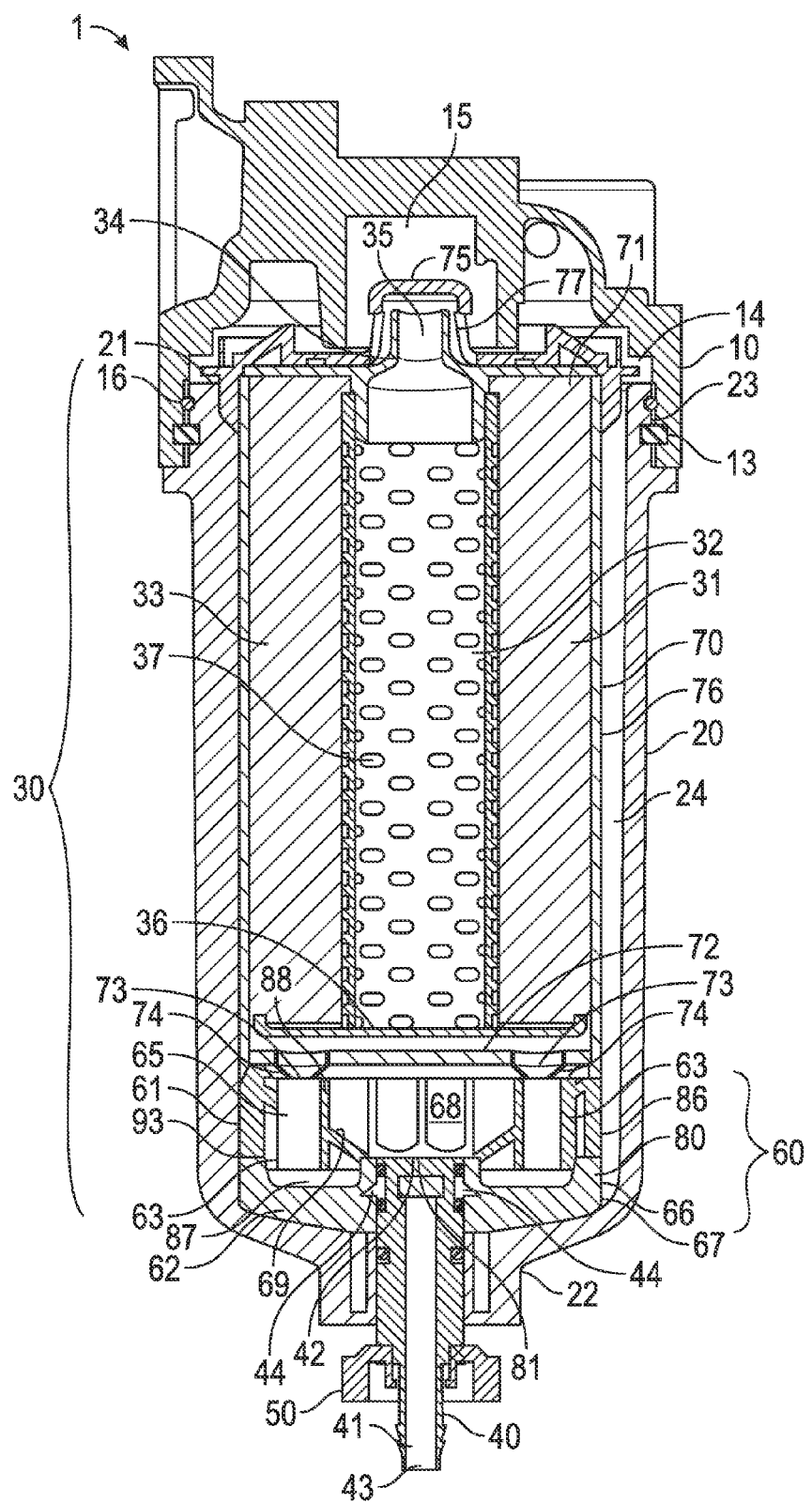
FIG. 2 is a cross-sectional view of the canister filter system of FIG. 1 taken along line II-II.

FIG. 2 is a cross-sectional view of the canister filter system 1 of FIG. 1 taken along line II-II'. As illustrated in FIG. 2, the base 10 also includes a base groove 13 and an inlet channel 14 that is in fluid communication with the inlet ports 11 shown in FIG. 1. The base 10 also includes an outlet channel 15 for fluid outlet from the canister filter system 1.

Further, as illustrated, the canister 20 includes an open end 21 and a closed end 22. Adjacent the open end 21 is a canister retaining member 23 which can be engage with a base groove 13 to hold the canister 20 to base 10. A canister retaining member 23 is one example of engagement structures may be included on the base 10 and canister 20. Other engagement structures may be included on the base 10 and canister 20 to form a releasable engagement. Other engagement structures, such as threads, ribs, and any other structure may be used as will be recognized by those of ordinary skill in this art.

An annular seal 16 may be formed circumferentially around the open end 21 of the canister 20 to provide a seal between the canister 20 and base 10. In one embodiment annular seal 16 provide a seal to prevent fluid in inlet channel 14 from leaking out of the joint between canister 20 and base 10. The annular seal 16 may be integrally formed with the open end 21 of the canister 20 or the base 10, or attached with adhesives or other methods, as may be apparent to a person of ordinary skill in the art.

The filter cartridge 30 includes a filter element 31, a precleaner element 60, and a filter housing 70. The filter element 31 may take many different forms to suit a particular application. In the illustrated embodiment, the filter element 31 is of a type suited for filtering fuel or lubrication oil. The filter element 31 includes a central reservoir defined by center tube 32 having one or more center tube openings 37 and circumferentially surrounded by annular filter media 33. Axial ends of filter media 33 are sealed by open end plate 34 and closed end plate 36. Open end plate 34 defines an axial open end of filter element 31. The open end plate 34 is termed "open" because it includes an opening 35 for allowing passage of fluid to outlet channel 15 from the central reservoir defined by center tube 32. Closed end plate 36 defines an axial closed end of filter element 31. The closed end plate 36 is termed "closed" because it prevents any fluid outside the filter element 31 adjacent axial end of filter media 33 from flowing unfiltered into center tube 32. Open end plate 34 and closed end plate 36 may each be joined to the center tube 32 via welding, adhesives, etc. Alternatively, several or all of center tube 32, open end plate 34, and closed end plate 36 may be constructed as unitary components.

The filter housing 70 includes a sidewall 76 with an open axial end 71 and a closed axial end 72 located at opposite axial ends of the sidewall 76. As illustrated, the filter housing 70 has a substantially cylindrical shape. The filter housing 70 circumferentially surrounds the filter element 31 and forms a barrier, which blocks fluid flowing toward the filter element 31 in the radial direction of the filter cartridge 30.

The filter housing 70 also includes one or more openings 73 formed in the closed axial end 72 of the filter housing 70, through which fluid can flow into the filter housing 70. Chamfered portions 74 are formed around each of the one or more openings 73. These chamfered portions 74 are oriented to extend away from the closed axial end 72 of the filter housing 70. Further, the chamfered portions 74 are angled inward to decrease in radius as illustrated. However, embodiments are not required to have chamfered portions 74 having the illustrated configuration, and may have any other configuration that may be apparent to a person of ordinary skill in the art, or may be omitted.

Additionally, a housing cap 75 engages the open axial end 71 of the filter housing 70 to enclose the filter element 31 into the filter housing 70 at the open end plate 34 of the filter element 31. The housing cap 75 has one or more housing cap openings 77 that fluidly communicate with the opening 35 of the open end plate 34. The housing cap 75 may be attached to the filter housing 70 by a threaded engagement, adhesive or any other fastening mechanism that may be apparent to a person of ordinary skill in the art.

Figure 3:
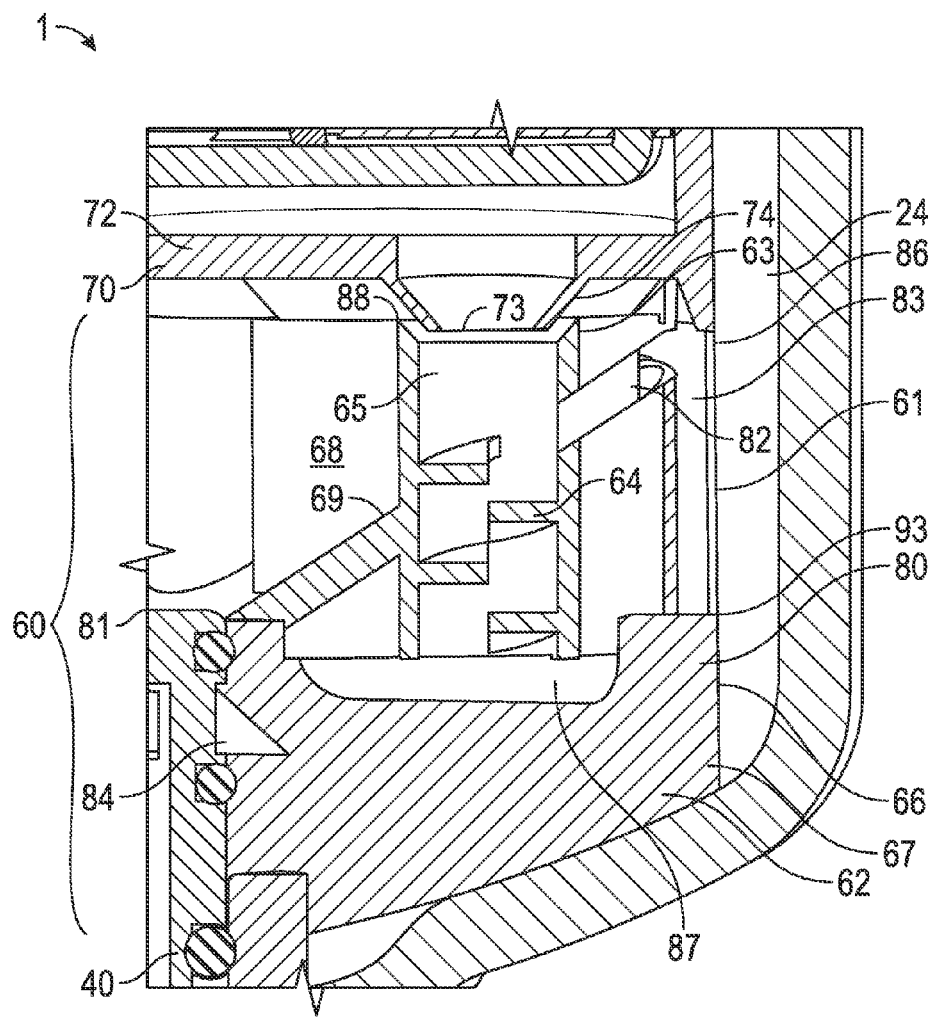
FIG. 3 is an enlarged portion of the cross-sectional view of the exemplary filter system of FIG. 2.

As illustrated in FIG. 2, the filter cartridge 30 includes a precleaner element 60 disposed proximate, or adjacent to the closed axial end 72 of the filter housing 70. FIG. 3 is an enlarged portion of the cross-sectional view of the exemplary filter system of FIG. 2 provided to show features that may not be visible in FIG. 2.

As illustrated, the precleaner element 60 includes a tubular member 61 and a spacer 62. The tubule member 61 is disposed adjacent to the filter housing 70 and the spacer 62 is disposed between the closed end 22 of the canister 20 and the tubule member 61. The tubule member 61 and spacer 62 may be attached together to form the precleaner element 60 by press-fitting, welding, adhesive, or any other attachment mechanism that may be apparent to a person of ordinary skill in the art. Alternatively, the tubule member 61 and spacer 62 may be formed as a single piece or may be formed as two pieces not attached to each other as may be apparent to a person of ordinary skill in the art.

As illustrated, the spacer 62 includes an upper plate 90 and a lower plate 91 spaced apart from each other with an interior space 84 therebetween. A support portion 80 may extend upward from the upper plate 90 to contact and support the tubule member 61. In some embodiments, the support portion 80 may be formed from a plurality of blocks as illustrated. However, embodiments are not limited to this configuration and may have other configurations as may be apparent to a person of ordinary skill in the art. Additionally, in some embodiments, the spacer 62 may also have a sidewall 92 connecting the upper plate 90 and the lower plate 91. Further, in some embodiments one or more drain flow openings 67 may be formed through the sidewall 92 of the spacer 62. The drain flow openings 67 fluidly connect into the interior space 84 of the spacer 62, which may fluidly communicate with the drain 40 via inflow ports 44 as discussed below.

The tubule member 61 is formed by an annular member 86 contacting the support portion 80 and an inner plate 69 disposed within the annular member 86. The annular member 86 and inner plate 69 may be attached together by adhesive, welding, or any other connecting mechanism, that may be apparent to a person of ordinary skill in the art. The annular member 86 and inner plate 69 may also be formed as a single piece. The annular member 86 may have a lower edge 93 and one or more radial openings 66 may be defined by the lower edge 93 of the annular member 86, the upper plate 90 and adjacent blocks of the support portion 80 of the spacer 62.

As illustrated, one or more vertical openings 65 are formed through the inner plate 69. The tubule member 61 also includes a plurality of tubules 63 that are extend through the vertical openings 65 of the inner plate 69.

As illustrated, the precleaner element 60 is disposed beneath the filter housing 70 and is oriented so that the upper end 88 of the tubules 63 are adjacent the one or more openings 73 formed in the closed axial end 72 of the filter housing 70. Further, each of the vertical openings 65 of the inner plate 69, through which the tubules 63 extend, are aligned or substantially aligned with one of the openings 73 formed in the filter housing 70.

Further in some embodiments, the chamfered portions 74 are at least partially inserted into the upper end 88 of the tubules 63 as illustrated in FIG. 3. However, embodiments need not have a configuration where the chamfered portions 74 are inserted into the openings 73.

In some embodiments, the tubules 63 may have protrusions such as fins 64 that extend radially inward as illustrated in FIG. 3. Further in some embodiments, the tubule member 61 may also include one or more angled flow channels 82 fluidly connecting one of the tubules 63 with a hollow radial region 83 of the tubule member 61 located radially outward of the tubules 63 as illustrated in FIG. 3. However, embodiments need not have angled flow channels 82 or a hollow radial region 83.

As illustrated, the filter system also includes a drain 40, which engages and penetrates the closed end 22 of canister 20 and into a hollow central interior region 68 disposed between two or more of the tubules 63 and above the inner plate 69 of the tubular member 61. The drain 40 provides a drain channel 41 for removing fluid from inside of canister 20. The drain 40 is elongated and includes an inlet end 42 and an outlet end 43 connected to one another by the drain channel 41. Inlet end 42 is inserted through a center hole 81 of the inner plate 69 and positioned inside of hollow central interior region 68 of the tubular member 63. Outlet end 43 is positioned outside of canister 20. Additionally, the drain 40 may also include inflow ports 44 fluidly connected to the drain flow openings 67 of the spacer 62. The drain 40 can be adapted to suit many different applications. The illustrated embodiment provides only one exemplary configuration for drain 40.

The drain 40 may also include a drain knob 50 having a valve mechanism to control flow through the drain channel 41. The specific configuration of the valve mechanism of the drain knob 50 is not particularly limited and may have any configuration as may be apparent to a person of ordinary skill in the art. The filter housing 70 is stacked on top of the tubule member 61 of the precleaner element 60 and the spacer 62 is disposed beneath the tubule member 61 with a fluid flow passage 87 formed between the tubule member 61 and the spacer 62.

Figure 4:
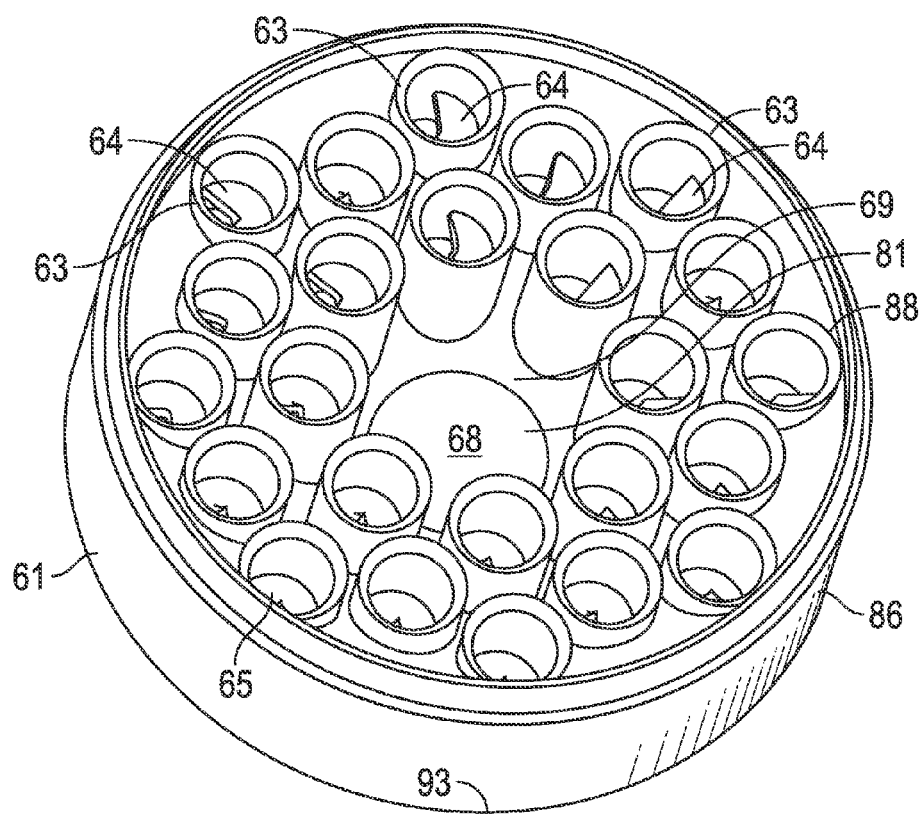
FIGS. 4 and 5 are perspective views of an exemplary tubule member of the precleaner element of exemplary filter system of FIGS. 2 and 3.
Figure 5:
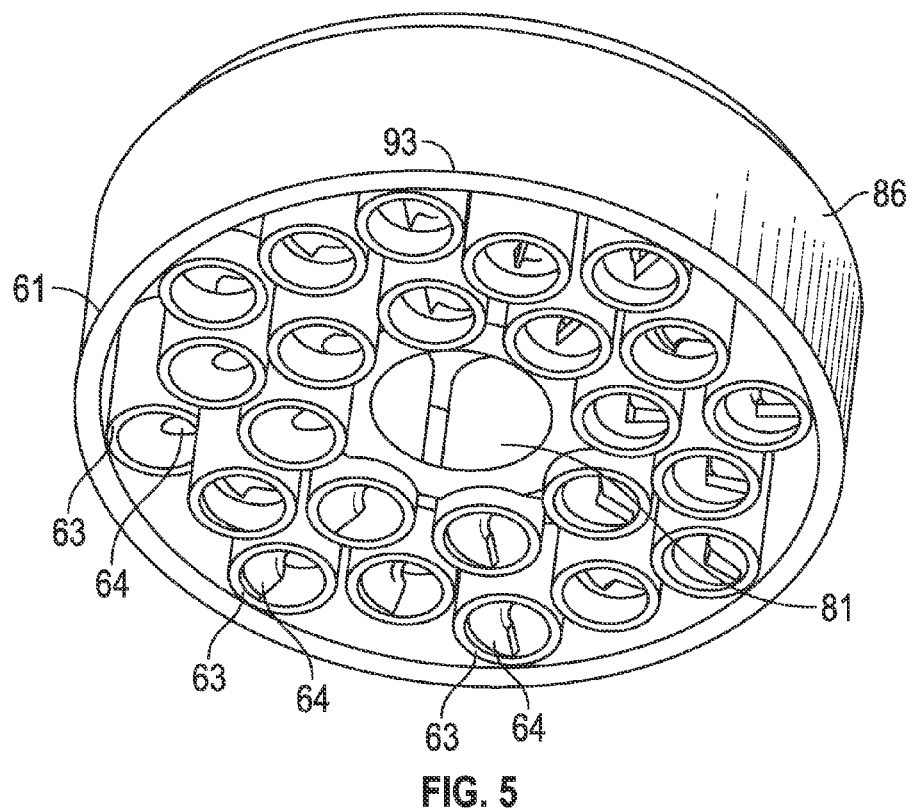

FIGS. 4 and 5 illustrate perspective views of the precleaner element 60. Specifically, FIG. 4 illustrates a perspective view of the top of the precleaner element 60 and FIG. 5 illustrates a perspective view of the bottom of the precleaner element 60. As illustrated, the plurality of tubules 63 extend through the entire height of the tubule member 61 and surround the hollow central interior region 68. Further, in some embodiments, the hollow central interior region 68 may not contain any tubules 63 and the inner plate 69 may have a conical shape, which slopes or is angled toward the center hole 81 formed in the tubule member 61 and the inlet end 42 of the drain 40. In such an embodiment, the inner plate 69 may intersect the tubules 63 at different vertical heights depending on the tubules 63 position along the radius of the tubule member 61.

As illustrated in FIGS. 4 and 5, the fins 64 formed in the tubules 63 may have a helical or spiral shape forming a spiraling flow path through the tubules 63. However, embodiments need not have protrusions or fins 64 having this shape and may have other shapes as may be apparent to a person of ordinary skill in the art. Further, embodiments need not have any protrusions in the tubules 63.

Figure 6:
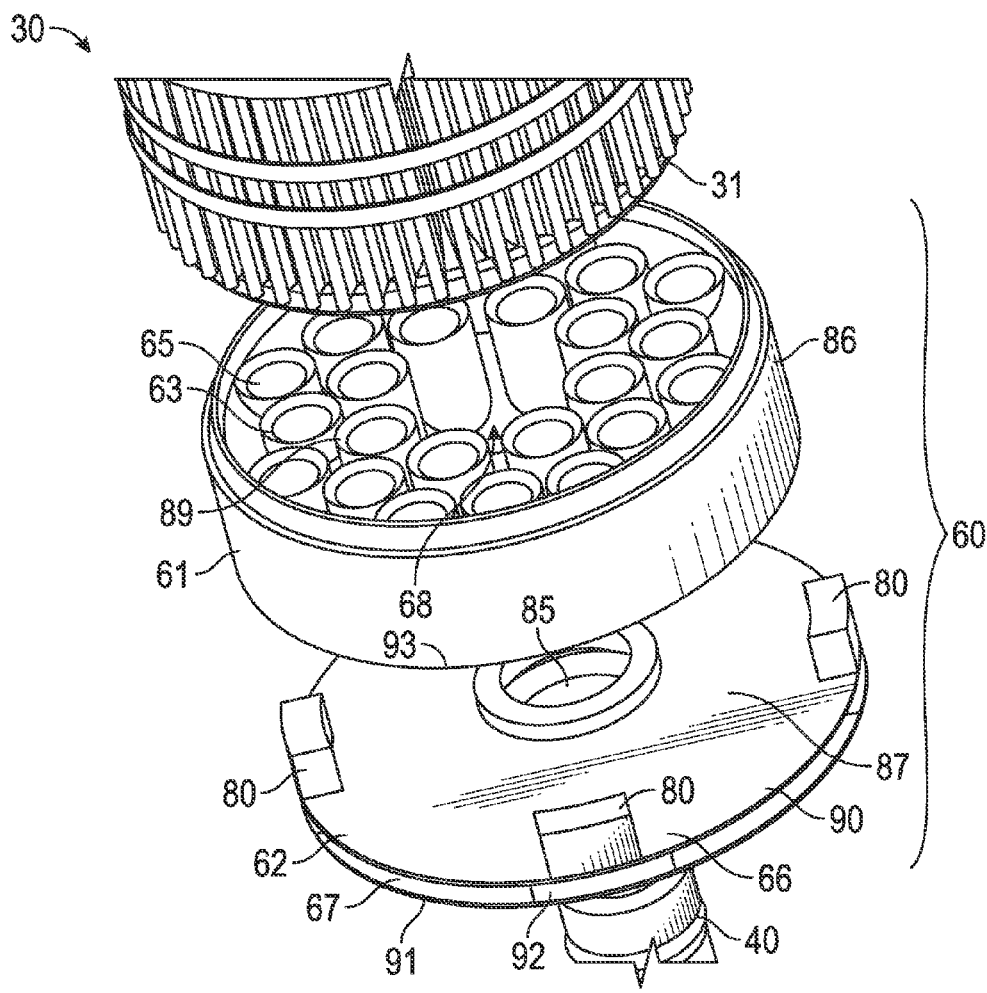
FIG. 6 is a partial, exploded perspective view of the filter cartridge shown in FIGS. 2 and 3.

FIG. 6 illustrates a partial, exploded perspective view of a portion of the filter cartridge 30 shown in FIG. 2 with the filter housing 70 removed for clarity. As illustrated, the hollow central interior region 68 is substantially aligned with one or more upper drain holes 85 formed in the spacer 62. With the hollow central interior region 68 aligned with the one or more upper drain holes 85, the hollow central interior region 68 can fluidly communicate with the interior space 84 of the spacer 62 through the center hole 81 of the tubule member 61 (illustrated in FIGS. 4 and 5) and the one or more upper drain holes 85.

Figure 7:
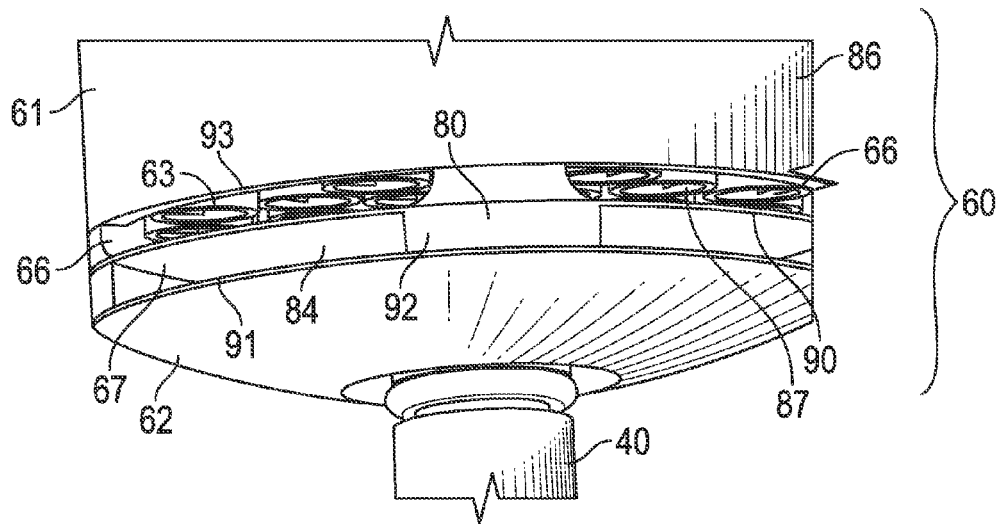
FIG. 7 is a perspective view of an exemplary precleaner element of the filter cartridge shown in FIGS. 2 and 3.

FIG. 7 illustrates a perspective view of the exemplary precleaner element 60 of the filter cartridge 30. The perspective view of FIG. 7 is oriented so that the space between the tubule member 61 and the spacer 62, and the tubules 63 are visible through adjacent radial openings 66 be defined by the lower edge 93 of the annular member 86, the upper plate 90 and support portion 80 of the spacer 62. As illustrated, the support portion 80 contact the tubule member 61 and the one or more radial openings 66. The support portion 80 separate the tubule member 61 and the spacer 62 so that the fluid flow passage 87 is formed between the tubule member 61 and the spacer 62. The tubules 63 of the tubule member 61 fluidly communicate with the fluid flow passage 87 between the tubule member 61 and the spacer 62.

Further, the drain flow openings 67 are formed in the spacer 62 below the one or more radial openings 66 defined by the lower edge 93 of the annular member 86, the upper plate 90 and support portion 80 of the spacer 62. The drain flow openings 67 fluid communicate with the interior space 84 of the spacer 62.

In an alternative embodiment, the arrangement is as described above with the exception that the precleaner element 60 may be positioned directly below and connected to the closed end plate 34 of the filter element 31 without any portion of the filter housing 70 being disposed between the closed end plate 34 of the filter element 31 and the precleaner element 60. In such an embodiment, a filter cartridge 30 includes the filter element 31 and precleaner element 60 provided as a single piece independent of the housing 70. In function, the filter cartridge 30 including the precleaner element 60 connected to the filter element 31 is positioned within the filter housing 70 as depicted in FIG. 2. Further, in some embodiments, the precleaner element 60 may be connected to the closed end plate 34 by press fitting, adhesive or other connection mechanisms as may be apparent to a person of ordinary skill in the art.

INDUSTRIAL APPLICABILITY

The canister filter system 1 may be used to filter contaminants from fluid systems including fuel systems, lubrication oil systems, hydraulic fluid power systems, hydraulic fluid control systems, transmission fluid systems, engine air intake systems, and the like, while permitting debris to be drained using drain 40.

Generally, fluid to be filtered enters through the inlet port 11, through the inlet channel 14 and into the annular cavity 24 between canister 20 and filter housing 70. The fluid then passes through the radial openings 66 defined by the lower edge 93 of the annular member 86, the upper plate 90 and support portion 80 of the spacer 62 and into the fluid flow passage 87 between the spacer 62 and the tubule member 61. The fluid then passes upward through one or more of the tubules 63 of the tubule member 61 and out the upper end 88 of the tubules 63 of the tubule member 61 of the precleaner element 60. The fluid then passes through the chamfered portions 74 and openings 73 of the closed axial end 72 of the filter housing 70. Once inside the filter housing 70, the fluid passes through the filter media 33, then into center tube 32. The fluid exits the center tube 32 through open end plate 34 and opening 35 into the outlet channel 15 and out the outlet ports 12. The open end plate 34 and closed end plate 36 help define the fluid channels into and out of filter media 33, preventing any fluid from flowing directly to outlet channel 15 and bypassing filter media 33.

Because the filter housing 70 prevents fluid entering through the inlet channel 14 from flowing radially toward the filter media 33, and instead forms an axial flow channel through the annular cavity 24 between the filter housing 70 and the canister 20, fluid flows along the length of the filter housing 70. With reference to the FIGS. 2 and 3, as the fluid flows axially along the filter housing 70, some of the particles or debris suspended in the fluid may become accelerated due to gravity, and settle at the bottom of the canister 20, while the fluid continues to flows into the radial openings 66 defined by the lower edge 93 of the annular member 86, the upper plate 90 and support portion 80 of the spacer 62. The particles or debris can flow into the drain flow openings 67 in the spacer 62 and settle within the interior space 84 of the spacer 62 and can be removed through the drain inflow ports 44 of the drain 40.

Further, as the fluid flows into the precleaner element 60, the fluid flows axially upward through the tubules 63 of the tubule member 61. As the fluid is directed upward, additional particles or debris may settle out of the fluid in the fluid flow passage 87 between the tubule member 61 and the spacer 62. With at least one upper drain holes 85 provided in the spacer, the particles or debris can settles out of the fluid in the interior 84 of the spacer 62 and can be removed through the drain inflow ports 44 of the drain 40.

Further, the protrusions or fins 64 are provided in the tubules 63 can disrupt the flow of fluid and induce turbulent or spiraling flow through the tubules 63 as the fluid is flows axially upward. As the flow through the tubules 63 is disrupted, additionally particles or debris may settle out of the fluid into the area beneath the tubule member 61. Further, with angled flow channels 82 provided, additionally particles or debris may be directed out of the tubules 63 and into the angled flow channels 82 to settle out of the fluid into the hollow radial region 83 and be pulled by gravity into the space between the tubule member 61 and the spacer 62. Again, with at least one upper drain holes 85 provided in the spacer 62, the particles or debris can settle into the interior space 84 of the spacer 62 and be removed through the drain inflow ports 44 of the drain.

Further, as the fluid is directed out of the upper end 88 of the tubules 63 of the tubule member 61 of the precleaner element 60, additionally particles or debris may collide with the chamfered portions 74 surrounding the openings 73 in the closed axial end 72 of the filter housing 70 and be directed away from the openings 73. As the particles or debris are directed away from the openings 73, the particles or debris can settle out of the fluid at the bottom of the hollow central interior region 68 of the tubule member 61. Further, with the hollow central interior region 68 formed above the inner plate 69, the particles or debris may be pulled by gravity toward the center of the hollow central interior region 68, where it can be removed through the drain 40 via the inlet end 42 positioned inside the hollow central interior 68.

Because of the arrangement and structures of the filter element 31, filter housing 70, precleaner element 60, and drain 40, particles or debris may be settled out of the fluid before the fluid contacts the filter media 33 reducing particulate or debris clogging of the filter media 33 and helping extend the work-life of the filter element 31.

During typical usage, the filter element 31 may become clogged or contaminated over time and require replacement at regular service intervals (e.g. every 6 months, every 12 months, every 18 months, etc.) During a filter element 31 replacement process, the canister 20 may be separated from the base 10 and the filter cartridge 30 removed from the canister 20. In some embodiments, the entire filter cartridge 30, including the filter housing 70, filter element 31, and the precleaner element 60, may be replaced with a new filter cartridge 30 that is inserted into the canister 20.

In other embodiments, the filter element 31 may be removed from the filter housing 70 and replaced with a new filter element 31. In such embodiments, the used filter housing 70 and the precleaner element 60 may be retained and used with the new filter element 31.

In still other embodiments, the filter element 31 may be connected to the precleaner element 60 and both the filter element 31 and the precleaner element 60 may be replaced with a new filter element 31 connected to a new precleaner element 60 during the filter element 31 replacement service. In such embodiments, the used filter housing 70 may be retained and used with the new filter element 31 and new precleaner element 60. However, embodiments need not require the filter element 31 replacement process discussed above, and may allow any combination of the components of the filter system 1 be replaced or retained during a filter element 31 replacement process.

While certain embodiments have been described, these embodiments have been presented by way of example only, and are not intended to limit the scope of the protection. It will be apparent to those skilled in the art that various modifications and variations can be made to the disclosed filter cartridge and filter systems without departing from the scope of the disclosure. Furthermore, various omissions, substitutions and changes in the form of the apparatus and systems described herein may be made without departing from the spirit of the protection. The accompanying claims and their equivalents are intended to cover such forms or modifications as would fall within the scope and spirit of the protection. Alternative implementations will be apparent to those skilled in the art from consideration of the specification and practice disclosed herein. It is intended that the specification and examples be considered as exemplary only, with a true scope of the disclosure being indicated by the following claims and their equivalents.

What is claimed is:

1. A filter cartridge comprising:
   a filter element;
   a filter housing comprising
      a sidewall surrounding the filter element and having a closed axial end located at one end of the sidewall, the closed axial end having a plurality of openings; and a tubule member located proximate to the closed axial end of the filter housing, the tubule member comprising an annular member, an inner plate disposed within the annular member and having a plurality of vertical openings in fluid communication with the opening of the closed axial end of the filter housing, a plurality of tubules, each tubule extending through one of the openings of the vertical inner plate, an upper plate disposed beneath the tubule member, and a support portion extending upward from the upper plate to the tubule member, and a radial opening defined by the annular member, the upper plate, and the support portion, wherein a fluid flow passage between the tubule member and the upper plate connects the radial opening to the vertical opening.

2. The filter cartridge of claim 1, wherein the tubule member has a hollow central interior region formed between at least two of the plurality of tubules and above the inner plate.

3. The filter cartridge of claim 2, wherein the inner plate has a center hole disposed below the hollow central region; and wherein the inner plate has a conical shape angled toward the center hole.

4. The filter cartridge of claim 1, wherein the tubule member comprises at least one fin extending inward within at least one of the tubules.

5. The filter cartridge of claim 4, wherein the at least one fin has a helical shape.

6. The filter cartridge of claim 1, wherein the filter housing comprises a chamfered portion surrounding at least one of the plurality of openings in the closed axial end of the filter housing, extending away from the closed axial end of the filter housing, and angled inward to decrease in radius, and wherein the chamfered portion is inserted into one of the plurality of tubules.

7. A filter system comprising:

a filter cartridge comprising a filter element;

a filter housing comprising a sidewall surrounding the filter element and having a closed axial end located at one end of the sidewall, the closed axial end having a plurality of openings; and a precleaner element located proximate to the closed axial end of the filter housing, the precleaner element comprising an annular member, an inner plate disposed within the annular member and having a plurality of vertical openings in fluid communication with the opening in the closed axial end of the filter housing, a plurality of tubules, each tubule extending through one of the vertical openings of the inner plate, an upper plate disposed below the annular member, a support portion extending upward from the upper plate, a radial opening defined by the annular member, the upper plate, and the support portion, and a fluid flow passage connecting the radial opening to the vertical opening; and a drain having an inlet end in fluid communication with the precleaner element.

8. The filter system of claim 7, wherein the precleaner element has a hollow central region formed between at least two of the plurality of tubules and above the inner plate.

9. The filter system of claim 8, wherein the inner plate has a center hole disposed below the hollow central region;

wherein the inlet end of the drain is inserted through the center hole and positioned below the hollow central region above the inner plate; and wherein the inner plate has a conical shape angled toward the inlet end of the drain inserted through the center hole.

10. The filter system of claim 7, wherein the precleaner element comprises at least one fin extending inward within at least one of the tubules.

11. The filter system of claim 10, wherein the at least one fin has a helical shape.

12. The filter system of claim 7, wherein the filter housing comprises a chamfered portion surrounding at least one of the plurality of openings in the closed axial end of the filter housing, extending away from the closed axial end of the filter housing, and angled inward to decrease in radius, and wherein the chamfered portion is at least partially inserted into one of the plurality of tubules.

13. A filter cartridge comprising a filter element comprising a filter media; and an end plate disposed at one end of the filter media; and a precleaner element located below and connected to the end plate of the filter element, the precleaner element comprising an annular member, an inner plate disposed within the annular member and having a plurality of vertical openings in fluid communication with the filter media, a plurality of tubules, each tubule extending through one of the vertical openings of the inner plate, an upper plate disposed below the annular member, a support portion extending upward from the upper plate, a radial opening defined by the annular member, the upper plate, and the support portion, and a fluid flow passage connecting the radial opening to the vertical opening.

14. The filter cartridge of claim 13, wherein the precleaner element has a hollow central region formed between at least two of the plurality of tubules and above the inner plate.

15. The filter cartridge of claim 14, wherein the inner plate has a center hole disposed below the hollow central region; and wherein the inner plate has a conical shape angled toward the center hole disposed below the hollow central region.

16. The filter cartridge of claim 13, wherein the precleaner element comprises at least one fin extending inward within at least one of the tubules.

17. The filter cartridge of claim 16, wherein the at least one fin has a helical shape.

* * * * *